(12) United States Patent
Sano

(10) Patent No.: US 7,253,962 B2
(45) Date of Patent: Aug. 7, 2007

(54) ZOOM LENS AND IMAGE PICKUP APPARATUS

(75) Inventor: Eigo Sano, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 36 days.

(21) Appl. No.: 11/313,758

(22) Filed: Dec. 22, 2005

(65) Prior Publication Data
US 2006/0139765 A1 Jun. 29, 2006

(30) Foreign Application Priority Data
Dec. 28, 2004 (JP) .............................. 2004-379278

(51) Int. Cl.
*G02B 15/14* (2006.01)
(52) U.S. Cl. ........................ 359/684; 359/676; 359/683
(58) Field of Classification Search ................ 359/676, 359/683, 684, 687
See application file for complete search history.

(56) References Cited

U.S. PATENT DOCUMENTS

| 5,136,430 | A | 8/1992 | Hamanishi |
| 5,414,562 | A | 5/1995 | Ueda |
| 5,966,245 | A | 10/1999 | Nagaoka |
| 7,113,346 | B1 * | 9/2006 | Souma et al. ............... 359/687 |

| 2002/0060855 | A1 | 5/2002 | Ohashi |
| 2004/0008271 | A1 | 1/2004 | Hagimori et al. |
| 2004/0021791 | A1 | 2/2004 | Nishina |

FOREIGN PATENT DOCUMENTS

| EP | 1677134 A1 * | 7/2006 |
| JP | 2000-131610 | 5/2000 |

OTHER PUBLICATIONS

European Search Report prepared for EP 05 25 7844, on Mar. 21, 2006.

* cited by examiner

*Primary Examiner*—David N. Spector
(74) *Attorney, Agent, or Firm*—Finnegan, Henderson, Farabow, Garrett & Dunner, L.L.P.

(57) ABSTRACT

A zoom lens including a first lens unit exhibiting a positive refractive power and always being statically positioned along an optical axis when a power of the zoom lens is varied or the focusing is conducted and including a reflective optical element for bending an optical path, a second lens unit exhibiting a negative refractive power and including a negative lens, a negative lens and a positive lens, along the optical axis in this order from an object side, a third lens unit exhibiting a positive refractive power, a fourth lens unit exhibiting a positive refractive power, and including at least two positive lenses, and a fifth lens unit exhibiting a negative refractive power, wherein the second lens unit, the fourth lens unit and the fifth lens unit are moved for varying the power of the zoom lens.

15 Claims, 10 Drawing Sheets

EMBODIMENT 3

EMBODIMENT 1
FIG. 4 (A)
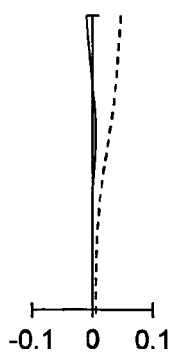
F = 3.55
SPHERICAL ABERRATION
— d-LINE
--- g-LINE
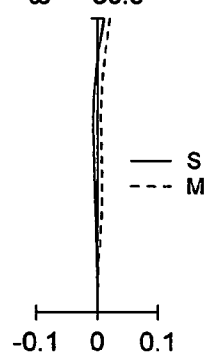
ω = 30.9°
ASTIGMATISM
— S
--- M
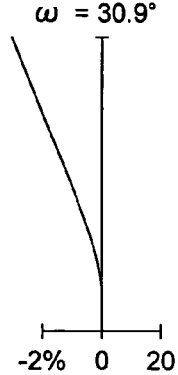
ω = 30.9°
DISTORTION
FIG. 4 (B)
F = 4.01
SPHERICAL ABERRATION
— d-LINE
--- g-LINE
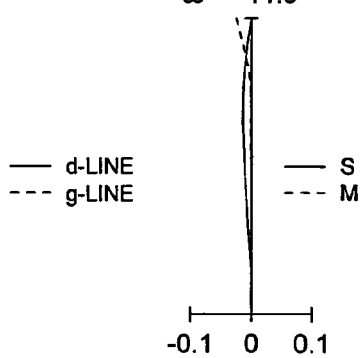
ω = 11.9°
ASTIGMATISM
— S
--- M
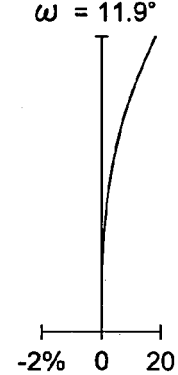
ω = 11.9°
DISTORTION
FIG. 4 (C)
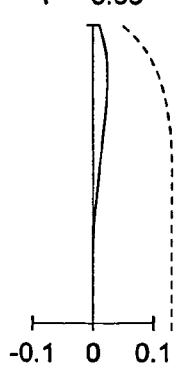
F = 5.68
SPHERICAL ABERRATION
— d-LINE
--- g-LINE
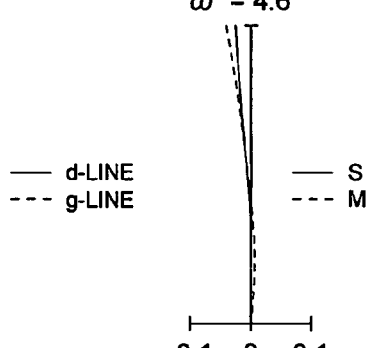
ω = 4.6°
ASTIGMATISM
— S
--- M
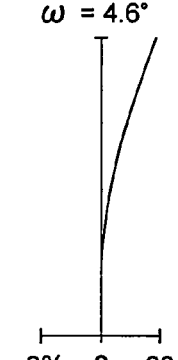
ω = 4.6°
DISTORTION

EMBODIMENT 2

EMBODIMENT 3

EMBODIMENT 4

EMBODIMENT 4

ZOOM LENS AND IMAGE PICKUP APPARATUS

This application is based on Japanese Patent Application No. 2004-379278 filed on Dec. 28, 2004 in Japanese Patent Office, the entire content of which is hereby incorporated by reference.

BACKGROUND OF THE INVENTION

The present invention relates to a zoom lens for focusing an optical image onto a solid state image pickup device such as a CCD image sensor or a CMOS image sensor, and an image pickup apparatus mounted herewith.

Recently, small sized digital still cameras or video cameras in which a small sized image pickup unit provided with a solid state image pickup element such as CCD (charge coupled device) or CMOS (complementary metal-oxide semiconductor) type image sensor is mounted, the requirement for a zoom lens having the higher imaging performance is increased following the higher pixelation of the solid state image pickup element. Further, for the zoom lens of a small sized image pickup apparatus, further size-reduction is required.

As a small sized zoom lens for a small sized image pickup apparatus, a zoom lens is provided with a first lens unit with a positive refractive power, a second lens unit with a negative refractive power, a third lens unit with a positive refractive power, and a fourth lens unit with a positive refractive power, and in which the size-reduction in the thickness direction of the zoom lens is achieved by arranging a prism which bends the optical path in the first lens unit (for example, refer to Patent Document 1). [Patent Document 1] JP-A 2000-131610

However, the zoom lens described in Patent Document 1 has only a small triple variable power ratio, and its overall length is relatively long compared to its focal length. Accordingly, desired is a zoom lens for the small sized image pickup apparatus, being more compact and having a higher variable power ratio.

SUMMARY OF THE INVENTION

The present invention has been achieved in view of the above problems. An object of the invention is to provide a small sized zoom lens which is very useful for digital cameras or video cameras using a solid state image pickup element with high pixel resolution, having high focusing characteristics and a variable power ratio of 5-7, as well as an image pickup apparatus using the same. The object of the present invention can be attained by the items described below.

Item 1

The zoom lens of the present invention provides:

a first lens unit having a positive refractive power and always statically positioned along the optical axis when the power of the zoom lens is varied or the zoom lens is focused;

a second lens unit exhibiting a negative refractive power;

a third lens unit exhibiting a positive refractive power;

a fourth lens unit exhibiting a positive refractive power; and a fifth lens unit exhibiting a negative refractive power, wherein the first through fifth lens units are arranged along the optical axis in this order from an object side of the zoom lens.

The second lens unit, the fourth lens unit and the fifth lens unit are moved to vary the power of the zoom lens.

The first lens unit includes a reflective optical element to bend the optical path.

The second lens unit is structured of a negative lens, a negative lens and a positive lens, along the optical axis in this order from an object side.

The fourth lens unit includes at least two positive lenses.

Based on the zoom lens described in Item 1, since arranged are;

a first lens unit exhibiting a positive refractive power;

a second lens unit exhibiting a negative refractive power;

a third lens unit exhibiting a positive refractive power;

a fourth lens unit exhibiting a positive refractive power; and a fifth lens unit exhibiting a negative refractive power, wherein the first through fifth lens units are arranged along the optical axis in this order from an object side of the zoom lens, it is possible to attain not only higher variable power but also small-sized zoom lens.

Further, the off-axial chromatic aberration in the entire zooming range can be effectively corrected by providing the second lens unit with a negative lens, a negative lens and a positive lens.

Yet further, when the variable power ratio is relatively high, the negative refractive power of the second lens unit is shared by the two negative lenses, and thereby any aberration in the entire zoom lens system is effectively corrected, specifically being distortion and chromatic aberration of magnification at the widest angle. In this case, at least one surface among the second lens unit should be an aspheric surface for the above effective correction. Yet further, generation of the spherical aberration, coma and curvature-of-field can be suppressed by providing the fourth lens unit including 2 positive lenses, whose refractive power is comparatively large in the lens units.

Item 2

In the invention described in Item 1, the zoom lens satisfies expression (1).

$$0.7 < \frac{f1}{\sqrt{fW \times fT}} < 2.0 \quad (1)$$

where, $f_1$: focal length of the first lens unit fW: focal length of the zoom lens at the wide angle end fT: focal length of the zoom lens at the telescopic end In the zoom lens described in Item 2, expression (1) adequately establishes the focal length of the first lens unit. By being greater than the lowest value, the refractive power of the first lens unit cannot become too great, and generation of aberration can be controlled in the first lens unit. By being less than the greatest value, the positive refractive power of the first lens unit is adequately assured, and thereby it is possible to shorten the overall length of the zoom lens. Additionally, expression (1') more adequately establishes the focal length of the first lens unit.

$$0.8 < \frac{f1}{\sqrt{fW \times fT}} < 1.5 \quad (1')$$

Item 3

In the invention described in Item 1 or 2, the zoom lens of the present invention satisfies expression (2).

$$-0.8 < \frac{f_2}{\sqrt{fW \times fT}} < -0.3 \quad (2)$$

$f_2$: focal length of the second lens unit
fW: focal length of the zoom lens at the wide angle end
fT: focal length of the zoom lens at the telescopic end In the zoom lens described in Item 3, expression (2) adequately establishes the focal length of the second lens unit. By being greater than the lowest value, the negative refractive power of the second lens unit is adequately assured, and in order to obtain a desired zoom ratio, the moving length of the second lens unit can be shortened, and thereby, the overall length of the zoom lens can be shortened. By being less than the greatest value, the negative refractive power of the second lens unit cannot become too great, and thereby, it is possible to control any generation of aberration in the second lens unit. Additionally, expression (2') more adequately establishes the focal length of the second lens unit.

$$-0.6 < \frac{f_2}{\sqrt{fW \times fT}} < -0.3 \quad (2')$$

Item 4

In the invention described in Items 1-3, the zoom lens of the present invention satisfies expressions (3) and (4).

$$n_{2P} > 1.80 \quad (3)$$

$$\upsilon_{2P} < 26.0 \quad (4)$$

where,
$n_{2P}$: refraction index wit respect to the d-line of the positive lens of the second lens unit,
$\upsilon_{2P}$: Abbe's number in d-line of the positive lens of the second lens unit.

Expression (3) can more adequately establish a refraction index of the positive lens of the second lens unit, while expression (4) can more adequately establish Abbe's number of the positive lens of the second lens unit. If value $n_{2p}$ is greater than 1.80 in expression (3), and by determining value $\upsilon_{2P}$ to be less than 26.0 in expression (4), then axial or non-axial chromatic aberration is effectively corrected in the entire zooming range. Additionally, expressions (3') and (4') are more effective:

$$n_{2P} > 1.85 \quad (3')$$

$$\upsilon_{2P} < 23.0 \quad (4')$$

Item 5

In the invention described in Items 1-4, the position of the third lens unit on the optical axis of the zoom lens is always fixed, even while zooming and focusing.

According to the zoom lens described in Item 5, since the position of the third lens unit on the optical axis is always fixed, even while zooming and focusing, possible is a simplified lens driving mechanism of an image pick up apparatus incorporating said zoom lens.

Item 6

In the invention described in Items 1-4, the third lens unit of the zoom lens has an aperture stop on an object side or an image side of said lens on the optical axis and a single positive lens at least one of the surfaces of which is aspherical.

According to the zoom lens described in Item 6, since the aperture stop is positioned adjacent to the third lens unit, and the third lens unit is structured of the single lens having at least one aspherical surface, assured are adequate spaces for moving the second lens unit and the fourth lens unit, and also effectively corrected are spherical aberration, coma, and field curvature. Further, by positioning the aperture stop on the object side of the third lens unit, it is possible to approximate the position of an entrance pupil to the object side on the optical axis, and it is also possible to downsize a reflective optical element and the diameter of the lens which is nearest to the object on the optical axis of the first lens unit. Accordingly, the thickness of the thickness direction of the image pickup apparatus can be reduced, which is of course preferable.

Item 7

The zoom lens of the present invention described in Items 1-6 is structured of a positive lens, a negative lens, and a positive lens, in this order from an object side of the zoom lens.

According to the zoom lens described in Item 7, since the fourth lens unit, having relatively high focusing function, is structured of the positive lens, negative lens and the positive lens in this order from an object side of the zoom lens, which is a so called triplet type, effectively corrected are spherical aberration, coma, and field curvature.

Item 8

The zoom lens of the present invention described in Items 1-7, wherein the fourth lens unit includes a cemented lens in which a positive lens and a negative lens are cemented.

According to the zoom lens described in Item 8, since the zoom lens includes the cemented lens, the number of the lens elements of the fourth lens unit decreases by one element, and thereby there is no need to adjust the position of each lens in the cemented lens, which creates very simple mass production.

Item 9

The zoom lens described in Items 1-8, the fifth lens unit of the zoom lens is structured of only one negative lens.

According to the zoom lens described in Item 9, since the fifth lens unit is structured of a single lens exhibiting a negative refractive power, space for moving the fourth lens unit is assured, and spherical aberration can be effectively corrected. Further, since the single lens exhibits negative refractive power, the Petzval sum is reduced, and curvature-of-field is appropriately corrected.

Item 10

The zoom lens described in Items 1-9, carries out focusing by moving the fourth lens unit or the fifth lens unit in an optical axial direction.

According to the zoom lens described in Item 10, the lens driving mechanism and lens driving algorism are simplified.

Item 11

The zoom lens described in Items 1-10 carries out focusing by moving the fourth lens unit and the fifth lens unit in an optical axial direction.

According to the zoom lens described in Item 11, in the case that the focal position changes greatly in an optical axial direction against the moving distance of any one of the fourth lens unit or the fifth lens unit, or in the case that the focal position changes greatly in an optical axial direction against the moving distances of the fourth lens unit and the fifth lens unit, focusing can be carried out by a less moving distance, which is a merit. However, in order to precisely carry out focusing, it is necessary to precisely move moving units (the fourth lens unit or/and the fifth lens unit). Actually, some actuators scarcely move the moving units for the minute distance. In this case, the fourth and the fifth lens unit should be integrally moved for focusing so that the focal position can be minutely changed against the moving distance in the optical axial direction. In addition, it is not necessary to perfectly match the moving distances of the fourth and fifth lens units, but the moving distance of each lens unit should be optimally determined in light of aberration characteristics while focusing the object in the close range, and thereby the lens units can be moved depending upon the determined moving distance.

Item 12

In the zoom lens described in Items 1-11, the zoom lens includes a sixth lens unit exhibiting positive refractive power, which has at least a single aspherical surface.

According to the zoom lens described in Item 12, since the sixth lens unit, exhibiting positive refractive power, is provided, the refractive power of each of the fifth lens unit and the sixth lens unit are increased, compared to the structure of the first lens unit through the fifth lens unit exhibiting the negative refractive power. Therefore, it is possible not only to assure a good image-side telecentric characteristics, but also to effectively correct any aberrations generated in the entire zoom lens system. Further, since at least a single aspherical surface is included, it is possible to obtain image-side telecentric characteristics of a high image angle, and effectively correct curvature-of-field and distortion.

Item 13

The zoom lens described in Items 1-11 is structured of five individual lens units which are the first lens unit, the second lens unit, the third lens unit, the fourth lens unit and the fifth lens unit.

According to the zoom lens described in Item 13, it is possible to produce the zoom lens having a reduced number of lenses, and the entire length of which is shorter, resulting in lower cost.

Item 14

The zoom lens described in Item 12 is structured of six individual lens units which are the first lens unit, the second lens unit, the third lens unit, the fourth lens unit, the fifth lens unit and the sixth lens unit.

According to the zoom lens described in Item 14, since the zoom lens is structured of six individual lens units, it is possible to assure good image-side telecentric characteristics, and to correct aberrations, and thereby it is possible to produce a zoom lens featuring a reduced number of lenses, and the entire length of which is shorter, produced by low cost. Additionally, by fixing the sixth lens unit, being nearest the image side, on an optical axis, dust is prevented from coating the image pickup device, which is of course preferable.

Item 15

An image pickup apparatus includes the zoom lens described in Items 1-14, and an image pickup element.

According to the invention described in Item 15, it is possible to provide a small sized zoom lens system for the digital cameras or video cameras, exhibiting high focusing characteristics and a zooming ratio of 5-7 incorporating a solid state image pickup apparatus, with high quality image elements.

BRIEF DESCRIPTION OF THE DRAWINGS

FIG. 4(A) shows aberrations relating to embodiment 1.
FIG. 4(B) shows aberrations relating to embodiment 1.
FIG. 4(C) shows aberrations relating to embodiment 1.

DETAILED DESCRIPTION OF THE PREFERRED EMBODIMENTS

Figure 1:
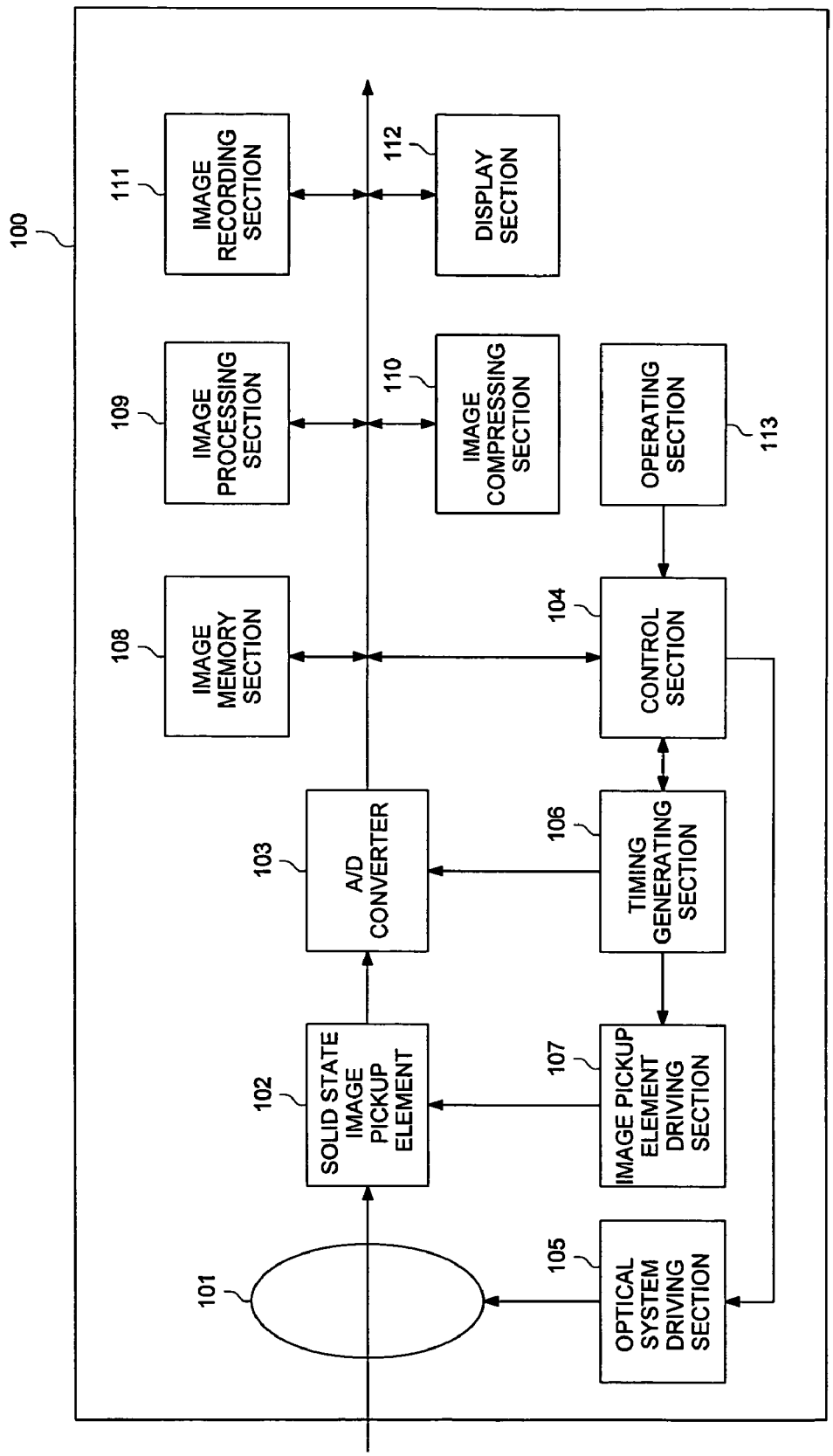
FIG. 1 is a block diagram of image pickup apparatus 100.
Figure 2:
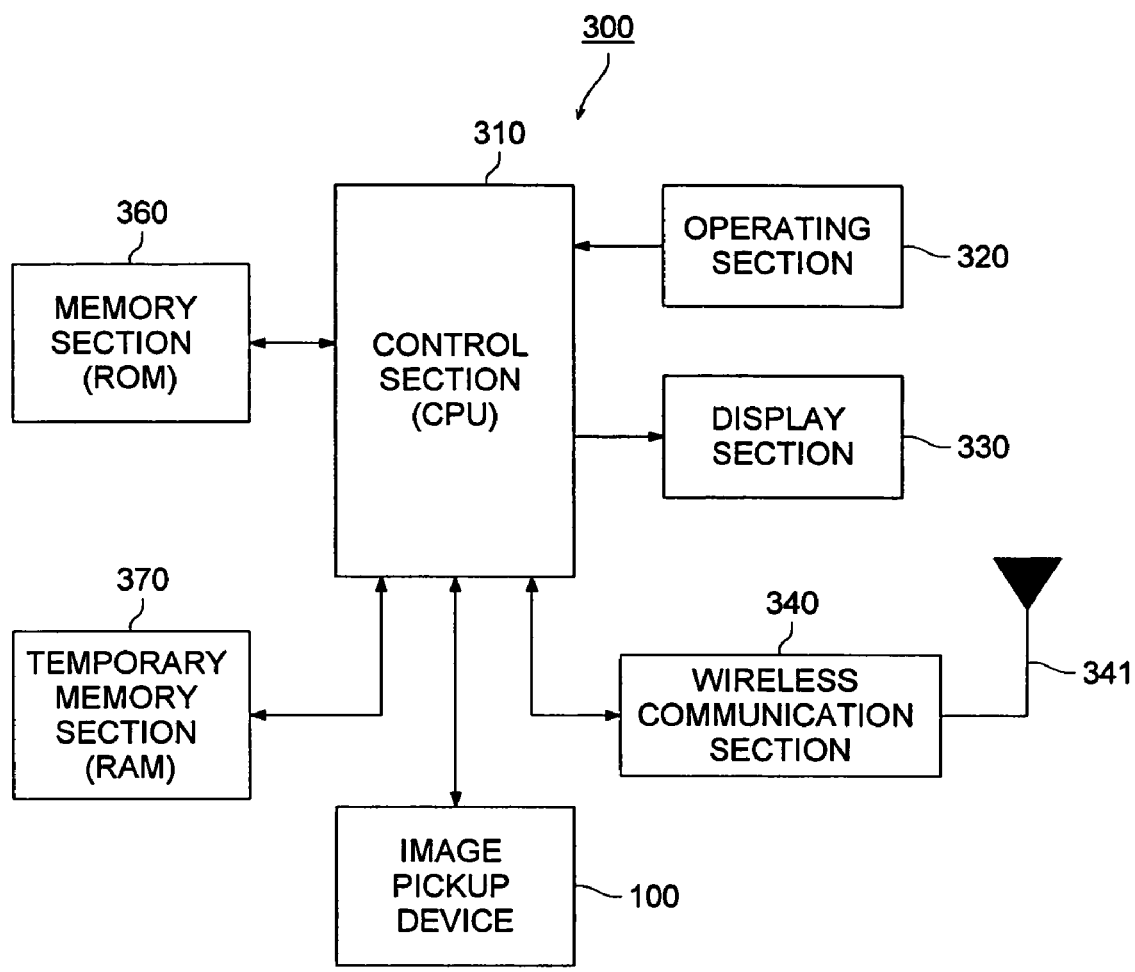
FIG. 2 is a block diagram which shows the interior structure of cellular phone 300.

Image pickup apparatus 100 incorporating a zoom lens relating to the embodiment of the invention will now be detailed referring to FIGS. 1 and 2. FIG. 1 is a block diagram of image pickup apparatus 100.

As shown in FIG. 1, image pickup apparatus 100 is structured of zoom lens 101, solid state image pickup element 102, A/D converting section 103, control section 104, optical system driving section 105, time generating section 106, image pickup apparatus driving section 107, image memory 108, image processing section 109, image compression section 110, image recording section 111, display section 112 and operating section 113.

Zoom lens 101 functions to form the image of the object onto an image pickup surface of image pickup apparatus 102. Solid state image pickup element 102 is an image pickup apparatus, such as a CCD or CMOS, which carries out optical conversion for each red, green and blue light of the incident light, and outputs their analog signals. A/D conversion section 103 converts the analog signals to digital image data.

Control section 104 controls each section of image pickup apparatus 100. Control section 104 includes CPU (central processing unit), RAM (random access memory) and ROM (read only memory). Control section 104 carries out various processes via the CPU, using various programs which were read out from ROM and developed onto RAM.

Control section 104 controls optical system driving section 105 to drive zoom lens 101, when zooming, focusing (which means to move second lens unit G2, fourth lens unit G4 and fifth lens unit G5, and will be described further later) and exposure are carried out. Time generating section 106 outputs timing signals to output the analog signals. Image pickup element driving section 107 controls solid state image pickup element 102 to operate scanning.

Image memory 108 stores readable and writable image data. Image processing section 109 carries out various image processes for the image data. Image compression section 110 compresses the image data, using an image compressing method, such as JPEG (joint photographic experts group). Image recording section 111 records the image data into the recording media, such as a memory card installed in a slot which is not illustrated.

Display section 112, being a color liquid crystal, displays photographed image data, through images before photographing, and various operation screens. Operation section 113 includes a release button, various mode setting, and various operational keys for setting the values. Operation section 113 outputs information inputted by the user to control section 104.

Now, the operation of image pickup apparatus 100 will be explained. When the object is photographed, apparatus 100 conducts monitoring of the object (display of the through images) on display 112, and conducts photography. In the monitoring procedure, the image of the object, taken via zoom lens 101, is focused on a light receiving surface of solid state image pickup element 102. Solid state image pickup element 102, which is placed on the optical axis at a rear section of zoom lens 101, is scanned by time generating section 106 and image pickup element driving section 107. Solid state image pickup element 102 outputs the analog signals for one image plane, wherein the analog signals are photo-electrically transferred corresponding to the light image formed by each periodic scan.

Gain adjustments of these analog signals are conducted for each of primary colors R, G and B, then the analog signals are transferred to digital data via A/D conversion section 103. Color processes, such as interpolation of image pixel and compensation of γ, are conducted on the digital data by image processing section 109. Further, digital brightness signal Y and color difference signals Cb and Cr (image data) are generated, and stored in image memory 108. These signals are periodically read out, eventually changed to video signals, which are then displayed on display section 112.

Display section 112 functions as an electrical finder for monitoring, which displays picked up images in real time. Under this condition, the user employs operating section 113 so that optical system driving section 105 moves zoom lens 101 for change of magnification, focusing and determination of exposure conditions.

Under the monitoring condition, when the user wants to photograph a still image, the user operates the release button of operating section 113, then still image data is obtained. Due to the operation of the release button, the image data for one frame is read out from image memory 108, and compressed by image compression section 110. This compressed data is recorded onto a recording media by image recording section 111.

Additionally, the description of this embodiment is an example of the zoom lens and the image pickup apparatus relating to the present invention, however, the invention is not limited to this example.

For example, in the above embodiment, the example of the digital still camera is detailed as the image pickup apparatus incorporating the zoom lens, however the apparatus is not limited to this, and also available are apparatuses such as a video camera, a cellular phone incorporating an image capturing function, a PHS (personal handy phone system) and a PDA (personal digital assistant), incorporating image capturing functions, all of which are portable terminals incorporating the image capturing function.

Further, the image pickup apparatus incorporating the zoom lens can be an image pickup unit which is to be equipped on the above apparatuses. Referring to FIG. 2, an example of cellular phone 300 incorporating image pickup apparatus 100 will now be detailed. FIG. 2 is a block diagram showing the interior structure of cellular phone 300.

As shown in FIG. 2, cellular phone 300 includes control section (CPU) 310 for overall controlling each section as well as carrying out the programs to conduct each process, operational section 320 for inputting the numbers via buttons, display section 330 for displaying predetermined data and captured images, wireless communication section 340 for communicating various information between external servers via antenna 341, image pickup apparatus 100, memory section (ROM) 360 for storing the system program of cellular phone 100, the various processing programs and the various data for terminal ID, and temporary memory section (RAM) 370 which is used for a working area to temporarily store the various processing programs and data used by control section 310, or processed data as well as the picked up data captured by image pickup apparatus 100.

In addition, control Section 104 of image pickup apparatus 100 is connected to control section 310 of cellular phone 300, which can communicate with each other. In this case, the functions of display section 112 and operational section 113 in FIG. 1 can be incorporated in cellular phone 300, but the function of image pickup apparatus 100 itself is fundamentally similar. Specifically, an external connecting terminal (which is not illustrated) of image pickup apparatus 100 is connected to control section 310 of cellular phone 300, whereby a release signal is sent from cellular phone 300 to image pickup apparatus 100, and the image signals, such as the brightness signal and the color difference signals obtained by photographing, are outputted from image pickup apparatus 100 to control section 310. Said image signals are stored in memory section 360 or displayed on display section 330 via the control system of cellular phone 300, or can be sent to an exterior portion as digital image information via wireless communication section 340.

Further, the image pickup apparatus incorporating the zoom lens of this invention can be structured as a camera module. The camera module includes the image pickup apparatus, and a circuit board including a control section and an image processing section. The camera module can be connected via a connector to another section having a display section and an operational section.

FIG. 1 shows an embodiment of the zoom lens which can be employed in image pickup apparatus 100, however the embodiment is not limited to this. Symbols used for each embodiment are as follows:

f: focal length of the entire zoom lens system;

r: curvature radius;

d: distance of the optical axis between the surfaces;

nd: refractive index of the lens material for d-line;

υd: Abbe's number of the lens material.

The shape of the aspherical surface of each embodiment is shown by expression (5), wherein the peak of surface is an original point, X axis is determined in the optical axial direction, and the height directed perpendicular to the optical axis is "h".

$$X = \frac{h^2/R}{1+\sqrt{1-(1+K)h^2/R^2}} + \sum A_i h^i \tag{5}$$

Where, $A_i$: the i-th aspherical number

R: curvature radius

K: circular conic constant

In the following descriptions, including the tables, power of 10 (for example, $2.5 \times 10^{-02}$) is shown by "E" (for example, 2.5E-02).

Embodiment 1

Specification
Focal lengths: f=6.40 mm, 16.50 mm and 42.60 mm
Image angles: 2ω=63.40°, 24.40° and 9.50°

Figure 3:
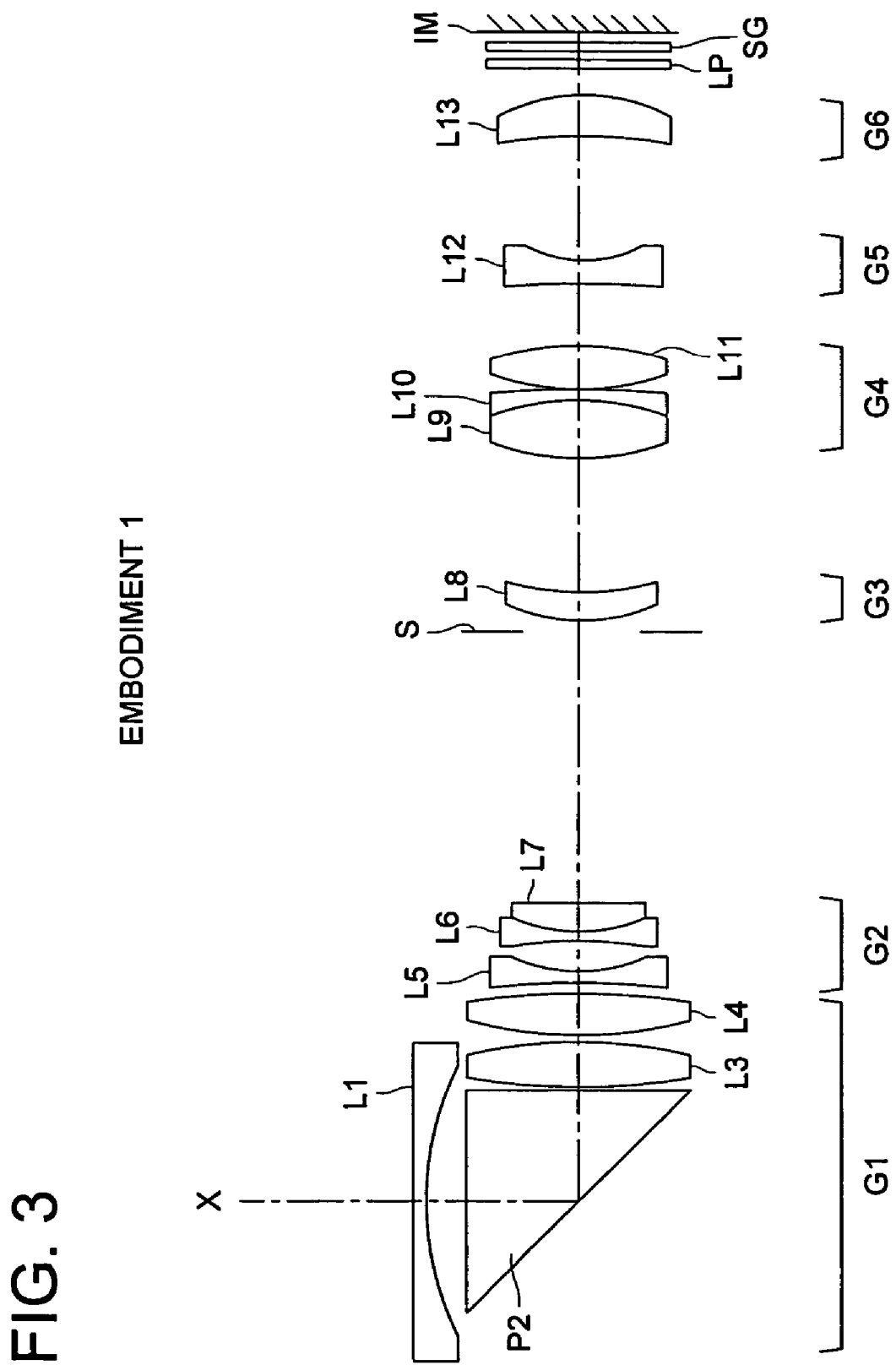
FIG. 3 is a cross section of a zoom lens relating to embodiment 1.

The lens data of the zoom lens relating to Embodiment 1 is shown in Table 1. FIG. 3 shows the cross sectional drawing of the zoom lens relating to Embodiment 1. FIG. 4 shows drawings of spherical aberration, astigmatism and distortion relating to Embodiment 1. That is, FIG. 4(A) shows aberrations when the focal length is 6.40 mm, FIG. 4(B) shows aberrations when the focal length is 16.50 mm, and FIG. 4(C) shows aberrations when the focal length is 42.60 mm.

TABLE 1(a)

| i | ri | di | ndi | vdi |
|---|---|---|---|---|
| 1 | −1711.485 | 0.70 | 1.80518 | 25.4 |
| 2 | 16.832 | 2.14 | | |
| 3 | ∞ | 5.50 | 1.84666 | 23.8 |
| 4 | ∞ | 5.50 | | |
| 5 | ∞ | 0.20 | | |
| 6 | 44.430 | 2.40 | 1.49700 | 81.6 |
| 7 | −20.791 | 0.20 | | |
| 8 | 22.211 | 2.20 | 1.69680 | 55.5 |
| 9 | −55.918 | Variable | | |
| 10 | −47.488 | 0.55 | 1.77250 | 49.6 |
| 11 | 7.960 | 1.61 | | |
| 12 | −21.032 | 0.50 | 1.77250 | 49.6 |
| 13 | 7.436 | 1.50 | 1.84666 | 23.8 |
| 14 | 616.079 | Variable | | |
| 15 | ∞ | 0.50 | | |
| 16 | 7.563 | 1.55 | 1.58913 | 61.2 |
| 17 | 14.709 | Variable | | |
| 18 | 11.558 | 3.00 | 1.48749 | 70.2 |
| 19 | −12.454 | 0.50 | 1.84666 | 23.8 |
| 20 | −81.681 | 0.20 | | |
| 21 | 13.944 | 2.20 | 1.53180 | 56.0 |
| 22 | −11.968 | Variable | | |
| 23 | −56.515 | 1.40 | 1.80440 | 39.6 |
| 24 | 7.051 | Variable | | |
| 25 | 919.989 | 2.20 | 1.53180 | 56.0 |
| 26 | −9.617 | 1.00 | | |
| 27 | ∞ | 0.42 | 1.54880 | 67.0 |
| 28 | ∞ | 0.50 | | |
| 29 | ∞ | 0.50 | 1.51633 | 64.1 |
| 30 | ∞ | | | |

TABLE 1(b)

[Aspherical coefficient]

2nd surface

K =   1.5377E−01
A4 =  4.8844E−05
A6 =  4.5944E−08
A8 = −1.8464E−09

11th surface

K =   0.0
A4 = −1.6861E−04
A6 = −1.6668E−06
A8 =  9.8993E−08

16th surface

K =   0.0
A4 = −2.1352E−04
A6 = −2.0538E−06
A8 = −2.5889E−08

21st surface

K =   0.0
A4 = −4.2300E−04

TABLE 1(b)-continued

[Aspherical coefficient]

A6 = −2.9224E−06
A8 = −5.9294E−08

22nd surface

K =   0.0
A4 =  2.1631E−04
A6 = −4.1901E−06
A8 = −8.9179E−11

25th surface

K =   0.0
A4 = −8.0240E−04
A6 = −4.3649E−06
A8 = −5.4981E−07

26th surface

K =   0.0
A4 = −4.6470E−04
A6 =  4.2111E−06
A8 = −4.7375E−07

TABLE 1(c)

| Focal length f | d9 | d14 | d17 | d22 | d24 |
|---|---|---|---|---|---|
| 6.40 | 0.50 | 13.77 | 6.83 | 2.95 | 6.23 |
| 16.50 | 7.22 | 7.05 | 4.16 | 3.23 | 8.62 |
| 42.60 | 11.97 | 2.30 | 1.20 | 1.21 | 13.60 |

The zoom lens of Embodiment 1 includes first lens unit G1 exhibiting a positive refractive power, second lens unit G2 exhibiting a negative refractive power, aperture stop S, third lens unit G3 exhibiting a positive refractive power, fourth lens unit G4 exhibiting a positive refractive power, fifth lens unit G5 exhibiting a negative refractive power, and sixth lens unit G6 exhibiting a positive refractive power, wherein the first through sixth lens units are arranged along optical axis X in this order from an object side of the zoom lens.

To vary the power of the zoom lens from the widest angled end to the most telescopic end, the positions of first lens unit G1, third lens unit G3, sixth lens unit G6 and aperture stop S do not move.

To vary the power of the zoom lens from the widest angled end to the most telescopic end, second lens unit G2 moves so that the distance between first lens unit G1 and second lens unit G2 increases, fourth lens unit G4 moves so that the distance between third lens unit G3 and fourth lens unit G4 decreases, fifth lens unit G5 moves so that the distance between fifth lens unit G5 and sixth lens unit G6 increases.

When focusing, at least fourth lens unit G4 or fifth lens unit G5 moves toward the object side along the optical axial direction.

During such focusing, focusing movement can be carried out, via moving any lens unit among the above mentioned movable lens units. However, second lens unit G2 is not suitable for focusing movement, because when second lens unit G2 moves along the optical axial direction, the focal length of the second lens unit G2 changes greatly compared to the optical axial moving length, and thereby the photographic angle varies extremely widely between pre-focusing and post-focusing.

Further, when fourth lens unit G4 and fifth lens unit G5 move along the optical axial direction, their focal positions also changes so greatly, compared to their optical axial moving length, that it is possible to focus the object via moving these lens units for only short distances, which is advantageous.

In addition, it is very important that the movable lens units are moved precisely for accurate focusing.

Some actuators have difficulty for moving the lens units for minute distances, however this difficulty can be overcome via moving fourth lens unit G4 together with fifth lens unit G5 for focusing, and thereby, the variation of focal point compared to their optical axial moving length can be reduced.

Further, it is not necessary that the moving length of fourth lens unit G4 is precisely equal to that of fifth length G5. Therefore, considering the aberration characteristic for focusing the object at a short distance, it is possible to determine the optimum moving distances of lens units G4 and G5 respectively.

Yet further, if a mechanical shutter, not illustrated, is mounted adjacent to aperture stop S whose position on the optical axis is fixed, a mechanical structure for moving the mechanical shutter is not necessary for zooming from the widest angle end to the most telescopic end. Accordingly, the thickness of thickness direction of the image pickup apparatus can be reduced.

First lens unit G1 includes negative lens L1 whose image side surface is aspherical, prism P2 which functions to bend an optical path by reflecting the light rays, positive lens L3, and positive lens L4.

Second lens unit G2 includes negative lens L5 whose image side surface is aspherical, and a cemented lens in which negative lens L6 and positive lens L7 are cemented.

Third lens unit G3 includes only positive lens L8 whose image side surface is aspherical. (However, aperture stop S can also be included in third lens unit G3 in each embodiment of the present invention).

Fourth lens unit G4 includes a cemented lens in which positive lens L9 and negative lens L10 are cemented, and positive plastic lens L11 whose both surfaces are aspherical.

Fifth lens unit G5 includes only negative lens L12.

Sixth lens unit G6 includes positive plastic lens L13 both image side surfaces of which are aspherical.

Both low pass filter LP whose optical surface is coated with an infrared cutting material, and sealing glass SG to cover the image pickup surface of solid state image pickup element IM, are placed between sixth lens unit G6 and an image pickup surface of solid state image pickup element IM. In the present embodiment, the aspherical surfaces are placed as described above, but are not necessary to be limit to this.

Embodiment 2

Specification

Focal lengths: f=6.30 mm, 16.30 mm and 41.90 mm

Image angles: 2ω=62.8°, 24.8° and 9.9°

Figure 5:
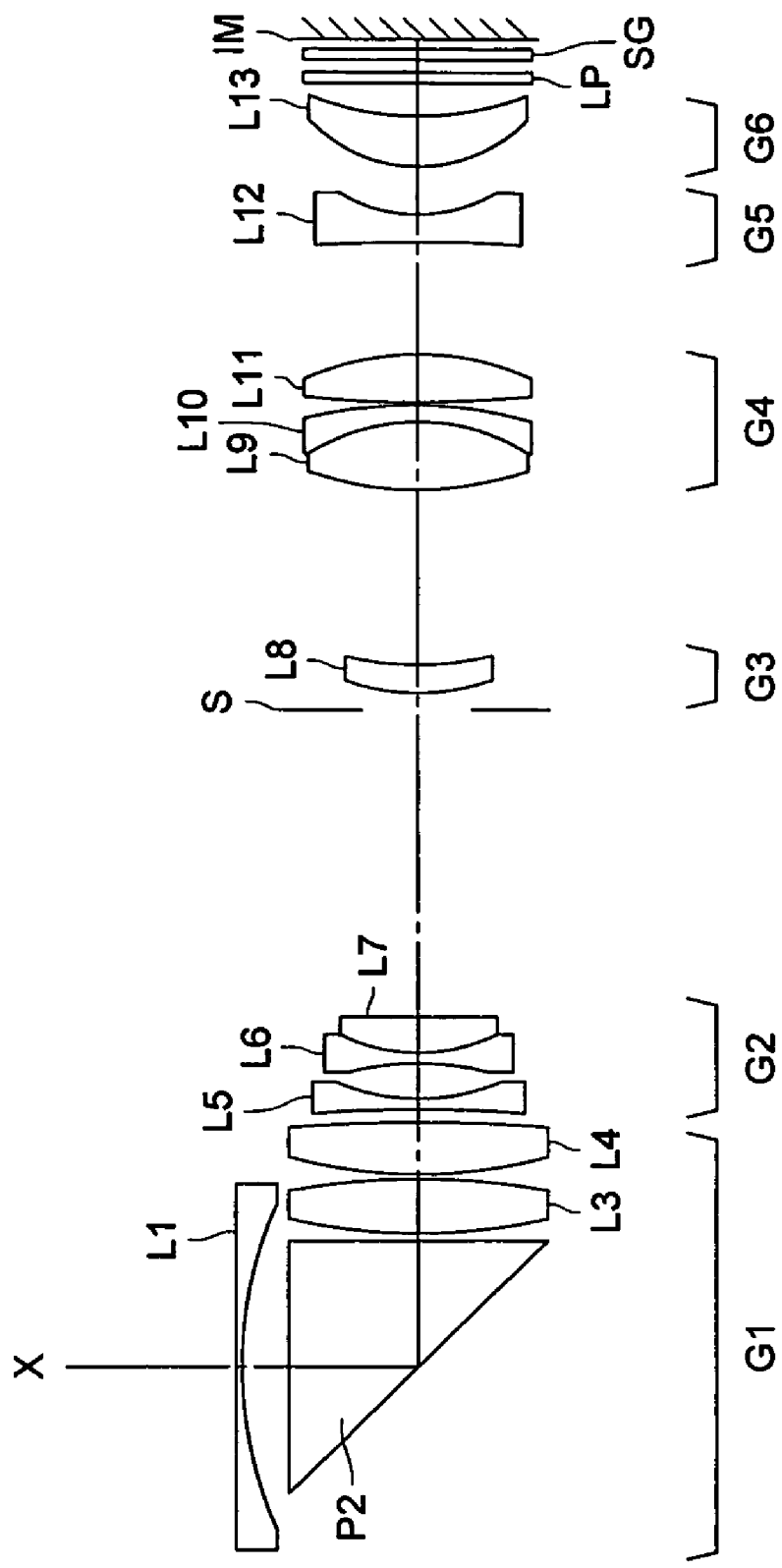
FIG. 5 is a cross section of a zoom lens relating to embodiment 2.
Figure 6:
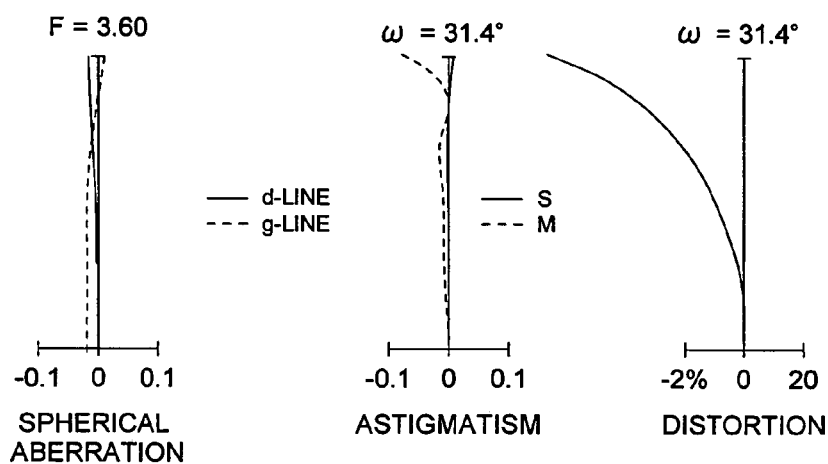
FIG. 6(A) shows aberrations relating to embodiment 2.
FIG. 6(B) shows aberrations relating to embodiment 2.
FIG. 6(C) shows aberrations relating to embodiment 2.
Figure 6:
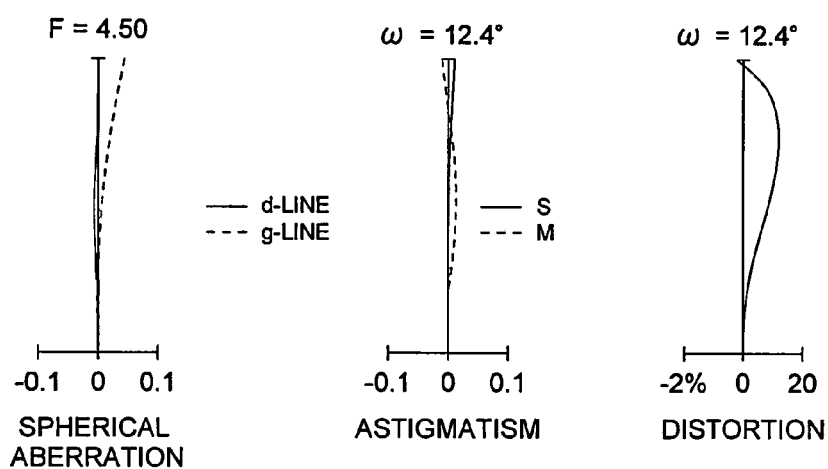
Figure 6:
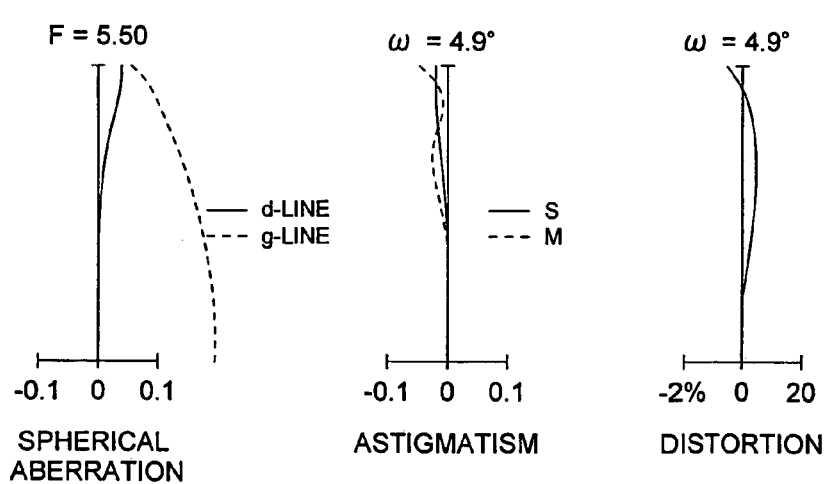

The lens data of the zoom lens relating to Embodiment 2 is shown in Table 2. FIG. 5 shows a cross sectional drawing of the zoom lens relating to embodiment 2. FIG. 6 shows the drawings of spherical aberration, astigmatism and distortion relating to embodiment 2. That is, FIG. 6(A) shows aberrations when the focal length is 6.30 mm, FIG. 6(B) shows aberrations when the focal length is 16.30 mm, and FIG. 6(C) shows aberrations when the focal length is 41.90 mm.

TABLE 2(a)

| i | ri | di | ndi | νdi |
|---|---|---|---|---|
| 1 | 110.926 | 0.55 | 1.84666 | 23.8 |
| 2 | 17.132 | 2.09 | | |
| 3 | ∞ | 5.40 | 1.84666 | 23.8 |
| 4 | ∞ | 5.40 | | |
| 5 | ∞ | 0.20 | | |
| 6 | 19.205 | 2.40 | 1.48749 | 70.2 |
| 7 | −40.241 | 0.20 | | |
| 8 | 21.306 | 2.20 | 1.66547 | 55.2 |
| 9 | −79.129 | Variable | | |
| 10 | −83.455 | 0.55 | 1.77377 | 47.2 |
| 11 | 8.714 | 1.45 | | |
| 12 | −18.026 | 0.50 | 1.77250 | 49.6 |
| 13 | 7.806 | 1.50 | 1.84666 | 23.8 |
| 14 | −234.257 | Variable | | |
| 15 | ∞ | 0.50 | | |
| 16 | 7.345 | 1.50 | 1.58913 | 61.2 |
| 17 | 12.355 | Variable | | |
| 18 | 15.202 | 3.00 | 1.48749 | 70.2 |
| 19 | −8.567 | 0.50 | 1.84666 | 23.8 |
| 20 | −21.793 | 0.20 | | |
| 21 | 24.089 | 2.20 | 1.53180 | 56.0 |
| 22 | −10.433 | Variable | | |
| 23 | −44.505 | 1.40 | 1.80610 | 40.9 |
| 24 | 7.544 | Variable | | |
| 25 | 7.375 | 2.20 | 1.53180 | 56.0 |
| 26 | 15.662 | 1.00 | | |
| 27 | ∞ | 0.42 | 1.54880 | 67.0 |
| 28 | ∞ | 0.50 | | |
| 29 | ∞ | 0.50 | 1.51633 | 64.1 |
| 30 | ∞ | | | |

TABLE 2(b)

[Aspherical coefficient]

8th surface

K = 0.0
A4 = −2.6216E−05
A6 = −1.1672E−07
A8 = −2.6507E−10

11th surface

K = 0.0
A4 = −9.4666E−05
A6 = −1.4058E−06
A8 = 1.0098E−07

16th surface

K = 0.0
A4 = −2.6585E−04
A6 = −3.2399E−06
A8 = 1.2869E−08

21st surface

K = 0.0
A4 = −3.5613E−04
A6 = −2.0565E−06
A8 = 1.4230E−07

22nd surface

K = 0.0
A4 = 1.1598E−04
A6 = −1.7704E−06
A8 = 1.2367E−07

25th surface

K = 0.0
A4 = 7.7653E−04
A6 = 9.6890E−06
A8 = −5.3826E−07

26th surface

K = 0.0

TABLE 2(b)-continued

[Aspherical coefficient]

| | |
|---|---|
| A4 = | 1.4341E−03 |
| A6 = | 1.5741E−05 |
| A8 = | −3.0294E−06 |

TABLE 2(c)

| Focal length f | d9 | d14 | d17 | d22 | d24 |
|---|---|---|---|---|---|
| 6.30 | 0.50 | 13.17 | 7.37 | 4.56 | 2.00 |
| 16.30 | 6.60 | 7.07 | 4.24 | 4.08 | 5.61 |
| 41.90 | 11.37 | 2.30 | 1.20 | 1.11 | 11.62 |

The zoom lens of Embodiment 2 includes first lens unit G1 exhibiting a positive refractive power, second lens unit G2 exhibiting a negative refractive power, aperture stop S, third lens unit G3 exhibiting a positive refractive power, fourth lens unit G4 exhibiting a positive refractive power, fifth lens unit G5 exhibiting a negative refractive power, and sixth lens unit G6 exhibiting a positive refractive power, wherein the first through sixth lens units are arranged along optical axis X in this order from an object side of the zoom lens.

To vary the power of the zoom lens from the widest angled end to the most telescopic end, the positions of first lens unit G1, third lens unit G3, sixth lens unit G6 and aperture stop S do not move.

To vary the power of the zoom lens from the widest angled end to the most telescopic end, second lens unit G2 moves so that the distance between first lens unit G1 and second lens unit G2 increases, fourth lens unit G4 moves so that the distance between third lens unit G3 and fourth lens unit G4 decreases, fifth lens unit G5 moves so that the distance between fifth lens unit G5 and sixth lens unit G6 increases.

When focusing, at least fourth lens unit G4 or fifth lens unit G5 moves toward the object side along the optical axial direction.

During such focusing, focusing movement can be carried out, via moving any lens unit among the above mentioned movable lens units. However, second lens unit G2 is not suitable for focusing movement, because when second lens unit G2 moves along the optical axial direction, the focal length of the second lens unit G2 changes greatly compared to the optical axial moving length, and thereby the photographic angle varies extremely widely between pre-focusing and post-focusing.

Further, when fourth lens unit G4 and fifth lens unit G5 move along the optical axial direction, their focal positions also changes so greatly, compared to their optical axial moving length, that it is possible to focus the object via moving these lens units for only short distances, which is advantageous.

In addition, it is very important that the movable lens units are moved precisely for accurate focusing.

Some actuators have difficulty for moving the lens units for minute distances, however this difficulty can be overcome via moving fourth lens unit G4 together with fifth lens unit G5 for focusing, and thereby, the variation of focal point compared to their optical axial moving length can be reduced.

Further, it is not necessary that the moving length of fourth lens unit G4 is precisely equal to that of fifth length G5. Therefore, considering the aberration characteristic for focusing the object at a short distance, it is possible to determine the optimum moving distances of lens units G4 and G5 respectively.

Yet further, if a mechanical shutter, not illustrated, is mounted adjacent to aperture stop S whose position on the optical axis is fixed, a mechanical structure for moving the mechanical shutter is not necessary for zooming from the widest angle end to the most telescopic end. Accordingly, the thickness of thickness direction of the image pickup apparatus can be reduced.

First lens unit G1 includes negative lens L1 whose image side surface is aspherical, prism P2 which functions to bend an optical path by reflecting the light rays, positive lens L3, and positive lens L4.

Second lens unit G2 includes negative lens. L5 whose image side surface is aspherical, and a cemented lens in which negative lens L6 and positive lens L7 are cemented.

Third lens unit G3 includes only positive lens L8 whose image side surface is aspherical. (However, aperture stop S can also be included in third lens unit G3 in the present invention).

Fourth lens unit G4 includes a cemented lens in which positive lens L9 and negative lens L10 are cemented, and positive plastic lens L11 whose both surfaces are aspherical.

Fifth lens unit G5 includes only negative lens L12.

Sixth lens unit G6 includes positive plastic lens L13 both image side surfaces of which are aspherical.

Both low pass filter LP whose optical surface is coated with an infrared cutting material, and sealing glass SG to cover the image pickup surface of solid state image pickup element IM, are placed between sixth lens unit G6 and an image pickup surface of solid state image pickup element IM. In the present embodiment, the aspherical surfaces a-re placed as described above, but are not necessary to be limit to this.

Embodiment 3

Specification

Focal lengths: f=6.30 mm, 13.70 mm and 30.00 mm
Image angles: 2ω=62.2°, 28.9° and 13.4°

Figure 7:
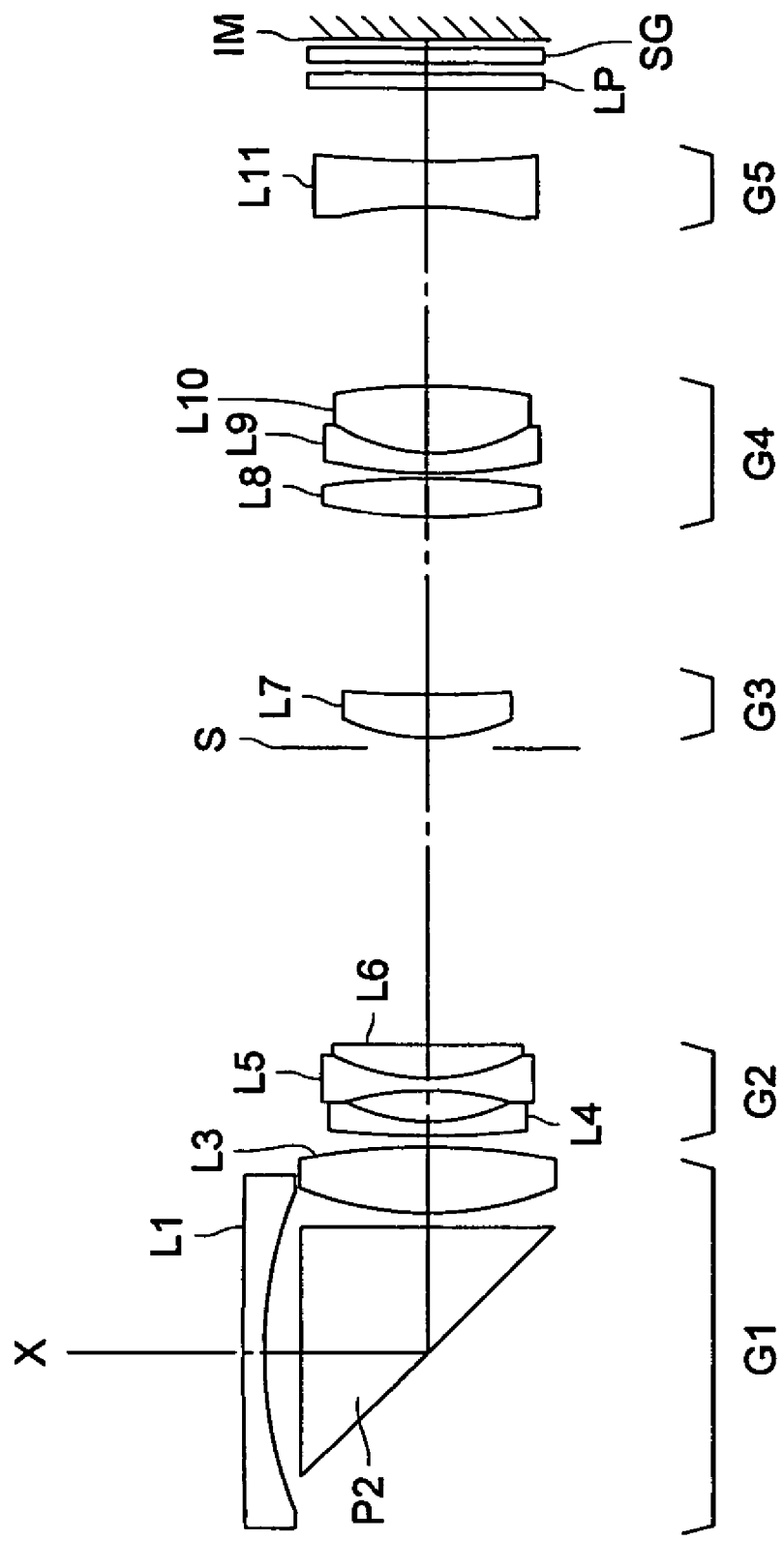
FIG. 7 is a cross section of a zoom lens relating to embodiment 3.
Figure 8:
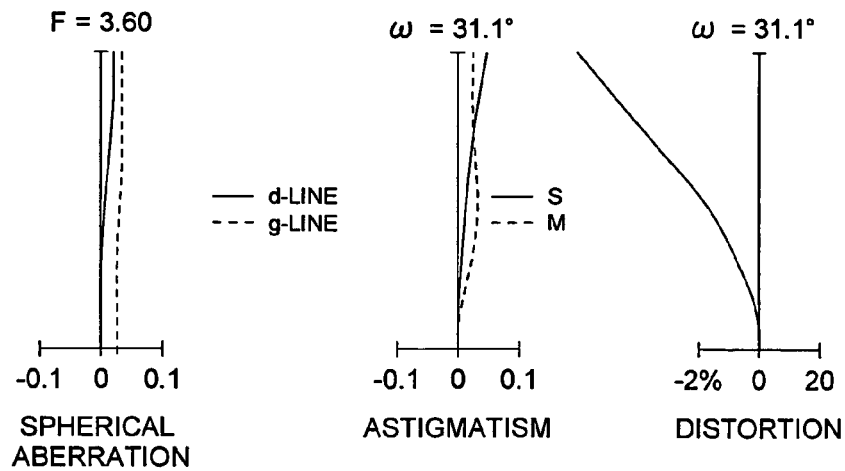
FIG. 8(A) shows aberrations relating to embodiment 3.
FIG. 8(B) shows aberrations relating to embodiment 3.
FIG. 8(C) shows aberrations relating to embodiment 3.
Figure 8:
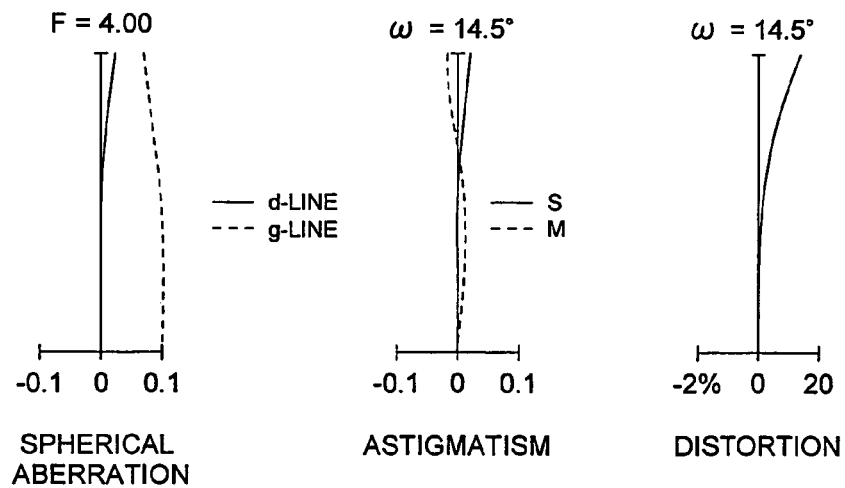
Figure 8:
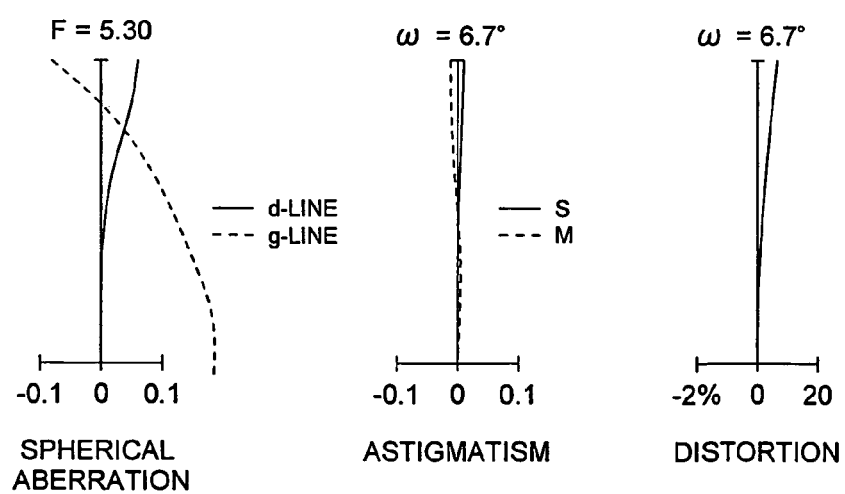

The lens data of the zoom lens relating to Embodiment 3 is shown in Table 3. FIG. 7 shows the cross sectional drawing of the zoom lens relating to Embodiment 3. FIG. 8 shows the drawings of spherical aberration, astigmatism and distortion relating to Embodiment 3. That is, FIG. 8(A) shows aberrations when the focal length is 6.30 mm, FIG. 8(B) shows aberrations when the focal length is 13.70 mm, and FIG. 8(C) shows aberrations when the focal length is 30.00 mm.

TABLE 3(a)

| i | ri | di | ndi | vdi |
|---|---|---|---|---|
| 1 | 112.787 | 0.60 | 1.84666 | 23.8 |
| 2 | 13.898 | 1.70 | | |
| 3 | ∞ | 4.80 | 1.90366 | 31.3 |
| 4 | ∞ | 4.80 | | |
| 5 | ∞ | 0.20 | | |
| 6 | 13.245 | 2.60 | 1.66547 | 55.2 |
| 7 | −21.729 | Variable | | |
| 8 | 52.629 | 0.52 | 1.77250 | 49.6 |
| 9 | 7.948 | 1.13 | | |
| 10 | −14.888 | 0.50 | 1.77250 | 49.6 |
| 11 | 6.693 | 1.25 | 1.84666 | 23.8 |
| 12 | 54.566 | Variable | | |
| 13 | ∞ | 0.50 | | |

TABLE 3(a)-continued

| i | ri | di | ndi | vdi |
|---|---|---|---|---|
| 14 | 7.205 | 1.60 | 1.58913 | 61.2 |
| 15 | 18.908 | Variable | | |
| 16 | 15.809 | 1.60 | 1.58913 | 61.2 |
| 17 | −31.825 | 0.20 | | |
| 18 | 20.570 | 0.72 | 1.84666 | 23.8 |
| 19 | 7.106 | 2.50 | 1.48749 | 70.2 |
| 20 | −37.888 | Variable | | |
| 21 | −33.163 | 2.00 | 1.53180 | 56.0 |
| 22 | 36.827 | Variable | | |
| 23 | ∞ | 0.42 | 1.54880 | 67.0 |
| 24 | ∞ | 0.50 | | |
| 25 | ∞ | 0.50 | 1.51633 | 64.1 |
| 26 | ∞ | | | |

TABLE 3(b)

[Aspherical coefficient]

6th surface

K = −6.7212E−01
A4 = −3.9206E−05
A6 = 1.7035E−07
A8 = 3.5972E−09

7th surface

K = 0.0
A4 = 2.6871E−05
A6 = 3.7636E−07
A8 = −1.7129E−10

14th surface

K = 0.0
A4 = −3.0671E−04
A6 = −2.9107E−06
A8 = 9.9336E−09

16th surface

K = 3.1724E−01
A4 = −2.5832E−04
A6 = −4.6632E−07
A8 = −5.5354E−08

21st surface

K = −2.0000E+01
A4 = −5.8776E−04
A6 = 9.5585E−06
A8 = −3.4929E−07

22nd surface

K = −2.0000E+01
A4 = −1.8400E−04
A6 = 9.5362E−06

TABLE 3(c)

| Focal length f | d7 | d12 | d15 | d20 | d22 |
|---|---|---|---|---|---|
| 6.30 | 0.45 | 11.30 | 6.51 | 6.95 | 2.70 |
| 13.70 | 6.58 | 5.17 | 3.92 | 9.89 | 2.35 |
| 30.00 | 10.70 | 1.05 | 1.02 | 5.15 | 9.99 |

The zoom lens of Embodiment 3 includes first lens unit G1 exhibiting a positive refractive power, second lens unit G2 exhibiting a negative refractive power, aperture stop S, third lens unit G3 exhibiting a positive refractive power, fourth lens unit G4 exhibiting a positive refractive power, fifth lens unit G5 exhibiting a negative refractive power, and sixth lens unit G6 exhibiting a positive refractive power, wherein the first through sixth lens units are arranged along optical axis X in this order from an object side of the zoom lens.

To vary the power of the zoom lens from the widest angled end to the most telescopic end, the positions of first lens unit G1, third lens unit G3, sixth lens unit G6 and aperture stop S do not move.

To vary the power of the zoom lens from the widest angled end to the-most telescopic end, second lens unit G2 moves so that the distance between first lens unit G1 and second lens unit G2 increases, fourth lens unit G4 moves so that the distance between third lens unit G3 and fourth lens unit G4 decreases, fifth lens unit G5 moves so that the distance between fifth lens unit G5 and sixth lens unit G6 increases.

When focusing, at least fourth lens unit G4 or fifth lens unit G5 moves toward the object side along the optical axial direction.

During such focusing, focusing movement can be carried out, via moving any lens unit among the above mentioned movable lens units. However, second lens unit G2 is not suitable for focusing movement, because when second lens unit G2 moves along the optical axial direction, the focal length of the second lens unit G2 changes greatly compared to the optical axial moving length, and thereby the photographic angle varies extremely widely between pre-focusing and post-focusing.

Further, when fourth lens unit G4 and fifth lens unit G5 move along the optical axial direction, their focal positions also changes so greatly, compared to their optical axial moving length, that it is possible to focus the object via moving these lens units for only short distances, which is advantageous.

In addition, it is very important that the movable lens units are moved precisely for accurate focusing.

Some actuators have difficulty for moving the lens units for minute distances, however this difficulty can be overcome via moving fourth lens unit G4 together with fifth lens unit G5 for focusing, and thereby, the variation of focal point compared to their optical axial moving length can be reduced.

Further, it is not necessary that the moving length of fourth lens unit G4 is precisely equal to that of fifth length G5. Therefore, considering the aberration characteristic for focusing the object at a short distance, it is possible to determine the optimum moving distances of lens units G4 and G5 respectively.

Yet further, if a mechanical shutter, not illustrated, is mounted adjacent to aperture stop S whose position on the optical axis is fixed, a mechanical structure for moving the mechanical shutter is not necessary for zooming from the widest angle end to the most telescopic end. Accordingly, the thickness of thickness direction of the image pickup apparatus can be reduced.

First lens unit G1 includes negative lens L1 whose image side surface is aspherical, prism P2 which functions to bend an optical path by reflecting the light rays, positive lens L3, and positive lens L4.

Second lens unit G2 includes negative lens L5 whose image side surface is aspherical, and a cemented lens in which negative lens L6 and positive lens L7 are cemented.

Third lens unit G3 includes only positive lens L8 whose image side surface is aspherical. (However, aperture stop S can also be included in third lens unit G3 in the present invention).

Fourth lens unit G4 includes a cemented lens in which positive lens L9 and negative lens L10 are cemented, and positive plastic lens L11 whose both surfaces are aspherical.

Fifth lens unit G5 includes only negative lens L12.

Sixth lens unit G6 includes positive plastic lens L13 both image side surfaces of which are aspherical.

Both low pass filter LP whose optical surface is coated with an infrared cutting material, and sealing glass SG to cover the image pickup surface of solid state image pickup element IM, are placed between sixth lens unit G6 and an image pickup surface of solid state image pickup element IM. In the present embodiment, the aspherical surfaces are placed as described above, but are not necessary to be limit to this.

Embodiment 4

Specification

Focal lengths: f=6.49 mm, 14.46 mm and 43.16 mm

Image angles: 2ω=60.6°, 27.2° and 9.20°

Figure 9:
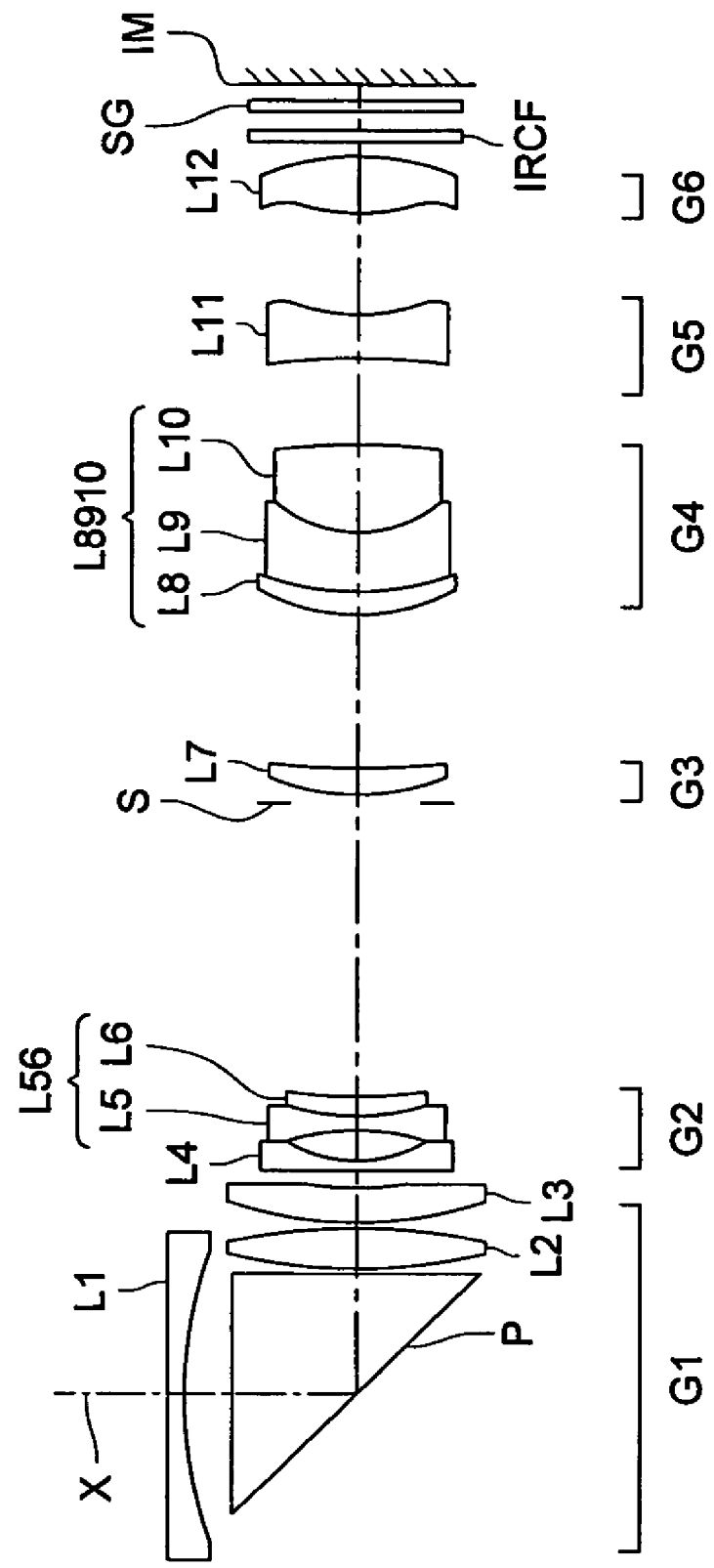
FIG. 9 is a cross section of a zoom lens relating to embodiment 4.
Figure 10:
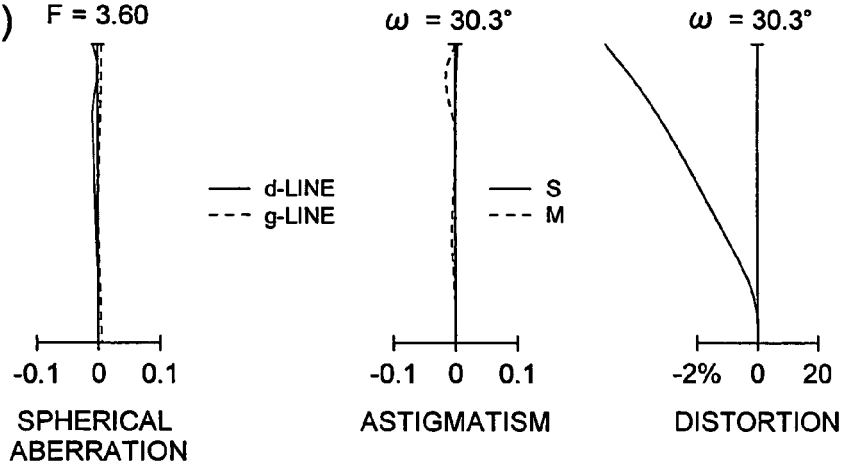
FIG. 10(A) shows aberrations relating to embodiment 4.
FIG. 10(B) shows aberrations relating to embodiment 4.
FIG. 10(C) shows aberrations relating to embodiment 4.
Figure 10:
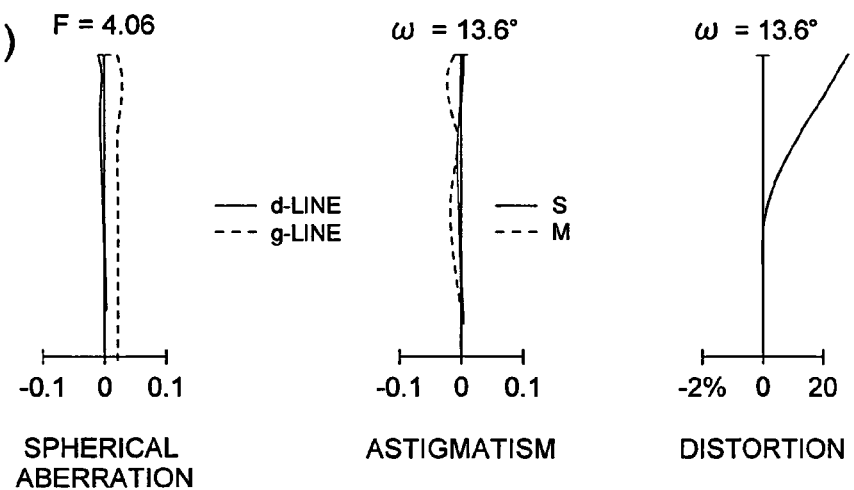
Figure 10:
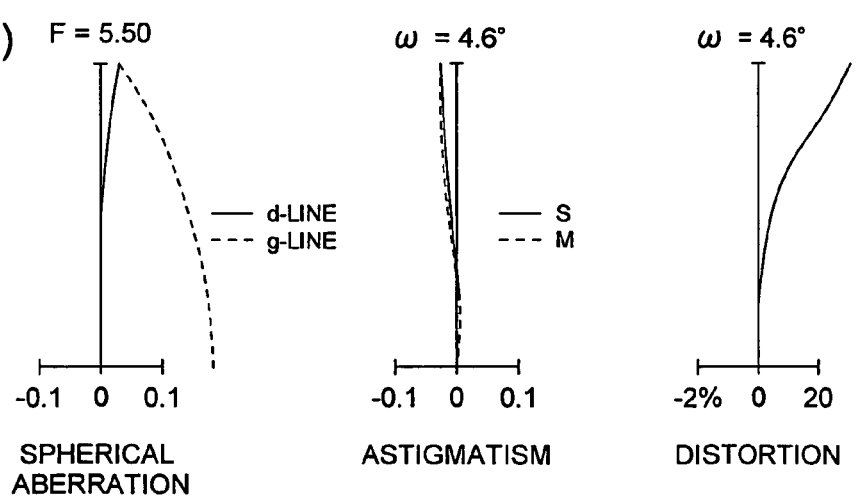

The lens data of the zoom lens relating to Embodiment 4 is shown in Table 4. FIG. 9 shows the cross sectional drawing of the zoom lens relating to Embodiment 4. FIG. 10 shows the drawings of spherical aberration, astigmatism and distortion relating to Embodiment 4. That is, FIG. 10(A) shows aberrations when the focal length is 6.49 mm, FIG. 10(B) shows aberrations when the focal length is 14.46 mm, and FIG. 10(C) shows aberrations when the focal length is 43.16 mm.

TABLE 4(a)

| i | ri | di | ndi | vdi |
|---|---|---|---|---|
| 1 | 110.700 | 0.60 | 1.84666 | 23.8 |
| 2 | 18.216 | 2.10 | | |
| 3 | ∞ | 5.80 | 1.90366 | 31.3 |
| 4 | ∞ | 5.80 | | |
| 5 | ∞ | 0.20 | | |
| 6 | 44.729 | 1.88 | 1.49700 | 81.6 |
| 7 | −25.550 | 0.20 | | |
| 8 | 17.973 | 1.71 | 1.72916 | 54.7 |
| 9 | 251.466 | Variable | | |
| 10 | −116.000 | 0.50 | 1.78590 | 44.2 |
| 11 | 8.029 | 1.24 | | |
| 12 | −14.600 | 0.50 | 1.72916 | 54.7 |
| 13 | 8.960 | 1.15 | 1.92286 | 20.9 |
| 14 | 63.080 | Variable | | |
| 15 | ∞ | 0.60 | | |
| 16 | 11.300 | 1.40 | 1.58313 | 59.4 |
| 17 | 64.361 | Variable | | |
| 18 | 9.070 | 1.23 | 1.48749 | 70.2 |
| 19 | 12.915 | 2.72 | 1.84666 | 23.8 |
| 20 | 6.168 | 4.00 | 1.58913 | 61.2 |
| 21 | −32.892 | Variable | | |
| 22 | −98.928 | 2.50 | 1.60700 | 27.0 |
| 23 | 11.552 | Variable | | |
| 24 | 15.315 | 2.50 | 1.52500 | 56.0 |
| 25 | −31.240 | 0.70 | | |
| 26 | ∞ | 0.50 | 1.51633 | 64.1 |
| 27 | ∞ | 0.90 | | |
| 28 | ∞ | 0.50 | 1.51633 | 64.1 |
| 29 | ∞ | | | |

TABLE 4(b)

[Aspherical coefficient]

16th surface

K = 0.0
A4 = −1.0151E−04

TABLE 4(b)-continued

[Aspherical coefficient]

A6 = 2.9427E−07
A8 = −6.1442E−08
A10 = 3.5164E−09

21st surface

K = 0.0
A4 = 3.9845E−04
A6 = 6.5552E−07
A8 = −1.0875E−07
A10 = 1.5572E−08

22nd surface

K = 0.0
A4 = −1.7899E−04
A6 = −2.6901E−05
A8 = 1.9058E−06
A10 = 4.5581E−08

23rd surface

K = 0.0
A4 = −2.7435E−04
A6 = −1.0766E−05
A8 = 4.4548E−07
A10 = 1.3810E−07

24th surface

K = 0.0
A4 = −1.2055E−03
A6 = 7.8733E−05
A8 = −6.4510E−06
A10 = 2.6289E−07
A12 = −8.6908E−09

25th surface

K = 0.0
A4 = −1.9168E−03
A6 = 1.4866E−04
A8 = −6.6183E−06
A10 = 6.0755E−09
A12 = 1.5276E−09

TABLE 4(c)

| Focal length f | d9 | d14 | d17 | d21 | d23 |
|---|---|---|---|---|---|
| 6.49 | 0.70 | 13.72 | 7.32 | 3.72 | 4.92 |
| 14.46 | 6.86 | 7.56 | 4.06 | 6.33 | 5.58 |
| 43.16 | 13.02 | 1.40 | 0.80 | 4.99 | 10.17 |

The zoom lens of Embodiment 4 includes first lens unit G1 exhibiting a positive refractive power, second lens unit G2 exhibiting a negative refractive power, aperture stop S, third lens unit G3 exhibiting a positive refractive power, fourth lens unit G4 exhibiting a positive refractive power, fifth lens unit G5 exhibiting a negative refractive power, and sixth lens unit G6 exhibiting a positive refractive power, wherein the first through sixth lens units are arranged along optical axis X in this order from an object side of the zoom lens.

To vary the power of the zoom lens from the widest angled end to the most telescopic end, the positions of first lens unit G1, third lens unit G3, sixth lens unit G6 and aperture stop S do not move.

To vary the power of the zoom lens from the widest angled end to the most telescopic end, second lens unit G2 moves so that the distance between first lens unit G1 and second lens unit G2 increases, fourth lens unit G4 moves so that the distance between third lens unit G3 and fourth lens unit G4 decreases, fifth lens unit G5 moves so that the distance between fifth lens unit G5 and sixth lens unit G6 increases.

When focusing, at least fifth lens unit G5 moves toward the object side along the optical axial direction.

During such focusing, focusing movement can be carried out, via moving any lens unit among the above mentioned movable lens units. However, second lens unit G2 is not suitable for focusing movement, because when second lens unit G2 moves along the optical axial direction, the focal length of the second lens unit G2 changes greatly compared to the optical axial moving length, and thereby the photographic angle varies extremely widely between pre-focusing and post-focusing.

Further, when fourth lens unit G4 and fifth lens unit G5 move along the optical axial direction, their focal positions also changes so greatly, compared to their optical axial moving length, that it is possible to focus the object via moving these lens units for only short distances, which is advantageous.

In addition, it is very important that the movable lens units are moved precisely for accurate focusing.

Some actuators have difficulty for moving the lens units for minute distances, however this difficulty can be overcome via moving fourth lens unit G4 together with fifth lens unit G5 for focusing, and thereby, the variation of focal point compared to their optical axial moving length can be reduced.

Further, it is not necessary that the moving length of fourth lens unit G4 is precisely equal to that of fifth length G5. Therefore, considering the aberration characteristic for focusing the object at a short distance, it is possible to determine the optimum moving distances of lens units G4 and G5 respectively.

Yet further, if a mechanical shutter, not illustrated, is mounted adjacent to aperture stop S whose position on the optical axis is fixed, a mechanical structure for moving the mechanical shutter is not necessary for zooming from the widest angle end to the most telescopic end. Accordingly, the thickness of thickness direction of the image pickup apparatus can be reduced.

First lens unit G1 includes negative lens L1, prism P2 which functions to bend an optical path by reflecting the light rays, positive lens L2, and positive lens L3.

Second lens unit G2 includes negative lens L 4, and a cemented lens L56 in which negative lens L5 and positive lens L6 are cemented.

Third lens unit G3 includes only glass molded positive lens L7 image side surface of which is aspherical.

Fourth lens unit G4 includes only cemented lens L8910 in which positive lens L8, negative lens L9 and glass molded positive lens L10 image side surface of which is aspherical, are cemented.

Fifth lens unit G5 includes only plastic negative lens L11 whose both surfaces are aspherical.

Sixth lens unit G6 includes only plastic positive lens L12 both image side surfaces of which are aspherical.

Both infrared cut filter IRCF whose optical surface is coated with an infrared cutting material, and sealing glass SG to cover the image pickup surface of solid state image pickup element IM, are placed between sixth lens unit G6 and an image pickup surface of solid state image pickup element IM. In the present embodiment, the aspherical surfaces are placed as described above, but are not necessary to be limit to this.

The values obtained by expressions (1) and (2) corresponding to the above embodiments are shown in Table 5.

TABLE 5

| | (1) Formula $\frac{f1}{\sqrt{fW \times FT}}$ | (2) Formula $\frac{f2}{\sqrt{fW \times FT}}$ |
|---|---|---|
| Embodiment 1 | 0.93 | −0.41 |
| Embodiment 2 | 1.00 | −0.47 |
| Embodiment 3 | 1.29 | −0.50 |
| Embodiment 4 | 1.12 | −0.39 |

Further, in the above mentioned embodiments, the prism is used for the reflective optical element which functions to bend the light path by reflecting the light rays, however the invention is not limited to a prism, and for example a mirror can alternatively be used. By structuring the reflective optical element as a prism, the diameter of light flux passing through the reflective optical system becomes small, and the prism can be downsized so that the thickness of the thickness direction of the image pickup apparatus can be reduced. Further, it is desirable that the prism is structured of material having the following expression (6).

$$ndp > 1.7 \tag{6}$$

Where ndp is a refractive index of the prism with respect to the d-line.

Expression (6) determines the scope of refraction index of the material of the prism. Being greater than the lower limit means that the diameter of the light flux passing through the prism becomes smaller, therefore the prism size can be reduced, and the thickness of the thickness direction of the image pickup apparatus can also be reduced.

In the above mentioned embodiments, the optical path is bent by 90 degrees by the prism in the same direction to the longer edge direction of the image pickup element, however, it is also possible to bend the optical path in the same direction to the shorter edge direction of the image pickup element. In the case of bending the optical path in the short edge direction, the size of the prism can be reduced, which is advantageous to downsize the zoom lens.

"The thickness of the thickness direction of the image pickup apparatus" in the present specification means the thickness measured in the direction to the optical axis of the light incident surface of the reflective optical element of the first lens unit.

For the zoom lens used for the image pickup apparatus provided with the solid state image pickup element, it is required that the zoom lens is the image-side telecentric optical system in order to obtain the good photo acceptance sensitivity over the entire areas of the image plane. This "image-side telecentric optical system" means that, the principal rays enter the image pickup surface of the solid state image pickup element at an angle parallel to the optical axis at each image height. In recent years, unsatisfied amounts of the image-side telecentric optical system can be corrected by appropriately arranging the micro lens array on the imaging surface of the solid state image pickup element.

Further, the "plastic lens" includes a lens whose base material is a plastic material, and which is formed of a material such that small diameter particles are dispersed in a plastic material whose volume ratio is more than 50%. The "plastic lens" further includes a lens on which a coating process was applied on its surface for the purpose of the reflection prevention or to increase the surface hardness.

What is claimed is:

1. A zoom lens, comprising:
a first lens unit exhibiting a positive refractive power and always being statically positioned along an optical axis when a power of the zoom lens is varied or focusing is carried out, and including a reflective optical element for bending an optical path;
a second lens unit exhibiting a negative refractive power, and including a negative lens, a negative lens and a positive lens, along the optical axis in this order from an object side;
a third lens unit exhibiting a positive refractive power;
a fourth lens unit exhibiting a positive refractive power, and including at least two positive lenses; and
a fifth lens unit exhibiting a negative refractive power;
wherein the first through fifth lens units are arranged along the optical axis in this order from an object side to an image side in the zoom lens, and
the second lens unit, the fourth lens unit and the fifth lens unit are moved for varying the power of the zoom lens.

2. The zoom lens in claim 1, satisfying expression (1), $$0.7 < \frac{f1}{\sqrt{fW \times fT}} < 2.0 \quad (1)$$

where,
$f_1$: focal length of the first lens unit,
fW: focal length of the zoom lens at a wide angle end, and
fT: focal length of the zoom lens at a most telescopic end.

3. The zoom lens in claim 1, satisfying expression (2), $$-0.8 < \frac{f2}{\sqrt{fW \times fT}} < -0.3 \quad (2)$$

$f_2$: focal length of the second lens unit,
fW: focal length of the zoom lens at the wide angle end, and
fT: focal length of the zoom lens at the most telescopic end.

4. Zoom lens in claim 1, satisfying expressions (3) and (4), $$n_{2p} > 1.80 \quad (3)$$

$$\upsilon_{2P} < 26.0 \quad (4)$$

where, $n_{2p}$: refraction index in d-line of the positive lens of the second lens unit,
$\upsilon_{2P}$: Abbe's number in d-line of the positive lens of the second lens unit.

5. The zoom lens in claim 1, wherein a position of the third lens unit on an optical axis is always fixed while zooming and focusing.

6. The zoom lens in claim 1, wherein the third lens unit includes an aperture stop on an object side or an image side of the single positive lens in the optical axis and a single positive lens having at least a single aspherical surface.

7. The zoom lens in claim 1, wherein the fourth lens unit includes a positive lens, a negative lens and a positive lens in this order from the image side.

8. The zoom lens in claim 1, wherein the fourth lens unit includes a cemented lens structured of a positive lens and a negative lens.

9. The zoom lens in claim 1, wherein the fifth lens unit is consisted of a single negative lens.

10. The zoom lens in claim 1 which carries out image focusing by moving the fourth lens unit or the fifth lens unit in the direction to the optical axis.

11. The zoom lens in claim 1 which carries out image focusing by moving the fourth lens unit and the fifth lens unit in the direction to the optical axis.

12. The zoom lens in claim 1, further including a six lens unit exhibiting a positive refractive power and having at least a single aspherical surface.

13. The zoom lens in claim 1, comprising the first lens unit, the second lens unit, the third lens unit, the fourth lens unit and the fifth lens unit.

14. The zoom lens in claim 12, comprising the first lens unit, the second lens unit, the third lens unit, the fourth lens unit, the fifth lens unit and the six lens unit.

15. An image pickup apparatus, comprising the zoom lens in claim 1, and an image pickup element.

* * * * *